UNITED STATES PATENT OFFICE.

COURT KARL FRIEDRICH LEO GROSS, OF CHRISTIANIA, NORWAY.

PROCESS FOR MANUFACTURING SYNTHETIC ISOPRENE.

1,099,498.     Specification of Letters Patent.     Patented June 9, 1914.

No Drawing.     Application filed June 12, 1913. Serial No. 773,248.

*To all whom it may concern:*

Be it known that I, COURT KARL FRIEDRICH LEO GROSS, a subject of the King of Norway, and residing at Christiania, in the Kingdom of Norway, have invented certain new and useful Improvements in Processes for Manufacturing Synthetic Isoprene, of which the following is a specification.

It is known matter to manufacture isoprene ($C_5H_8$) by bringing the vapors of turpentine oil to pass through pipes of iron, copper or silver, heated to red heat or through a glowing mass of pulverized copper or silver.

The present invention has for its object a process for manufacturing synthetic isoprene of turpentine oil, giving a large yield of isoprene relatively to the amount of raw material used.

The invention consists therein, that the vapors of turpentine oil at a temperature below 700° C. is brought into contact with one or more metal oxids, metal oxid hydrates or metal oxychlorids or with one or more basic metal salts.

The process can be carried out in different ways; according to the circumstances and the consistence of the oxid as used the vapors of the turpentine oil can be brought to pass through or past the said oxid. After treating the vapors in this way they are condensed by being rapidly cooled, eventually by means of a freezing mixture.

As catalyst a metal oxid is most suitable, and it has proved that a very good effect is obtained with copper oxid in a finely divided state. The said catalyst suitably is introduced in a pipe or in a system of pipes, through which the vapors of the turpentine oil are brought to pass. The catalytic-effect of the copper oxid will begin at a temperature of 264-267° C. but the temperature is held higher, although not so high that the oxid is reduced into metal. It has proved, that the catalyst will act in a very effective manner, if it is brought into a plastic state. Such a plastic mass can be obtained by mingling a waterfree oxid with a saturated solution of a chlorid of the same or another metal, whereby a plastic or dough-like mass is obtained which is suitably pressed in a form and dried in the free air or by heat.

In case copper oxid be used, it is mingled during stirring with a saturated solution of copper chlorid. This plastic mass can of course be placed into a pipe of iron, copper or any other metal. But the best result is gained by forming of said mass a pipe or a receiver of any other shape and by inclosing said pipe or receiver in a closed metallic shell. It is also possible to provide closed metal pipes or other receivers on the inside with a layer of the plastic mass. The said layer ought to be about 2 centimeters thick. As the mass is porous and can be made more porous by suitable additions the vapors can pass through the whole layer and in this way a contact surface will be obtained, which is very great and far greater than that which is obtained by using metal oxid in pieces. Besides the effective contact surface is maintained unchanged during the whole process. It has proved that by using such catalysts as described a yield of isoprene of up to 40% can be obtained. The vapors can be made to pass through the pipes or receivers with or without using pressure.

Having now described my invention what I claim and desire to protect by Letters Patent is:

1. The process of manufacturing isoprene from turpentine oil which consists in bringing vapors of said oil into contact with a metallic oxid at a temperature between 264° and 700° C.

2. The process of manufacturing isoprene from turpentine oil which consists in bringing vapors of said oil into contact with a mixture of metallic oxid and a metallic chlorid at a temperature between 264° and 700° C.

3. The process of manufacturing isoprene from turpentine oil which consists in bringing vapors of said oil into contact with copper oxid at a temperature between 264° and 700° C.

4. The process of manufacturing isoprene from turpentine oil which consists in bringing the vapors of said oil into contact with a mixture of copper oxid and copper chlorid of a temperature between 264° and 700° C.

In testimony whereof I have affixed my signature in presence of two witnesses.

COURT KARL FRIEDRICH LEO GROSS.

Witnesses:
M. E. GULBORENSEN,
RUTH LINDSTRÖM.